United States Patent
Karp et al.

(10) Patent No.: US 7,032,222 B1
(45) Date of Patent: Apr. 18, 2006

(54) METHOD AND SYSTEM FOR DETERMINING RESOURCE ALLOCATION TO USERS BY GRANTING REQUEST BASED ON USER ASSOCIATED DIFFERENT LIMITS AND RESOURCE LIMIT

(75) Inventors: Alan H. Karp, Palo Alto, CA (US); Thomas Rokicki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 09/687,436

(22) Filed: Oct. 13, 2000

(51) Int. Cl.
*G06F 9/46* (2006.01)

(52) U.S. Cl. ............... 718/104; 718/100; 718/102; 709/226

(58) Field of Classification Search ............ 709/100, 709/103, 104, 102, 226; 718/100, 102, 104
See application file for complete search history.

(56) References Cited

U.S. PATENT DOCUMENTS

| | | | | |
|---|---|---|---|---|
| 5,446,737 A | * | 8/1995 | Cidon et al. | 370/452 |
| 5,596,576 A | * | 1/1997 | Milito | 370/450 |
| 5,708,709 A | * | 1/1998 | Rose | 705/59 |
| 5,838,968 A | * | 11/1998 | Culbert | 709/104 |
| 6,021,116 A | * | 2/2000 | Chiussi et al. | 370/236 |
| 6,092,163 A | * | 7/2000 | Kyler et al. | 711/163 |
| 6,421,529 B1 | * | 7/2002 | Wing et al. | 455/67.7 |
| 6,430,592 B1 | * | 8/2002 | Davison | 709/103 |
| 6,438,704 B1 | * | 8/2002 | Harris et al. | 713/502 |
| 6,457,008 B1 | * | 9/2002 | Rhee et al. | 707/10 |
| 6,457,142 B1 | * | 9/2002 | Klemm et al. | 714/38 |
| 6,515,963 B1 | * | 2/2003 | Bechtolsheim et al. | 370/229 |
| 2001/0034831 A1 | * | 10/2001 | Brustoloni et al. | 713/151 |
| 2001/0043575 A1 | * | 11/2001 | Kelly | 370/321 |
| 2002/0009051 A1 | * | 1/2002 | Cloonan | 370/232 |
| 2002/0162344 A1 | * | 11/2002 | Reason et al. | 62/217 |
| 2003/0045237 A1 | * | 3/2003 | Gardner et al. | 455/63 |

OTHER PUBLICATIONS

Mounsey, Stephen. "Disk Quotas", University of Cambridge, Dept. of Engineering, Oct. 9, 1997.*
StudentWeb. "Do I have a disk limit/quota? How does it work?", General Account FAQ, Feb. 2000, pp. 2-3.*

*Primary Examiner*—Meng-Al T. An
*Assistant Examiner*—Lilian Vo

(57) ABSTRACT

A method for flexible allocation of a resource in which a soft limit and a hard limit are assigned to each of a set of potential users of the resource. The soft limits are selected to guarantee access to the resource by all of the potential users. The hard limits are selected to enable each potential user to exceed the corresponding soft limit on a first-come-first-served basis. A request from a user for allocation of a portion of the resource is handled by granting the request if the request if allowed would not exceed soft limit assigned to the user. The request is denied if the request if allowed would exceed the hard limit assigned to the user. To avoid overtaxing the capacity of the resource, the request is denied even when the hard limit of the user is not exceeded if the request if allowed would cause a total allocation of the resource to exceed a high watermark assigned to the resource.

26 Claims, 3 Drawing Sheets

METHOD AND SYSTEM FOR DETERMINING RESOURCE ALLOCATION TO USERS BY GRANTING REQUEST BASED ON USER ASSOCIATED DIFFERENT LIMITS AND RESOURCE LIMIT

BACKGROUND OF THE INVENTION

1. Field of Invention

The present invention pertains to the field of computer systems. More particularly, this invention relates to flexible allocation of a resource in a computer system.

2. Art Background

A computer system typically includes resources that are shared among multiple users. An example of a shared resource is a shared physical memory. Examples of a shared physical memory include main memory, persistent memory including mass storage devices, and information stores, etc. Another example of a shared resource is a communication link. Yet another example of a shared resource is a processor.

A shared resource usually has a limited capacity or limited capability with respect to the needs of the potential users of the shared resource. For example, a physical memory usually has a limited storage capacity. A communication link typically has a limited bandwidth. A processor usually has a limited instruction execution throughput. As a consequence, computer systems commonly implement methods for allocating the capacity or capability of a shared resource among the users of the shared resource.

One prior method for allocating a shared resource is to employ static partitioning. For example, static partitioning may be applied to a physical memory having a storage capacity of C bytes by allocating C/n bytes to each of n potential users of the physical memory. Unfortunately, such static partitioning usually limits each user to C/n bytes even when a only a small percentage of the potential users actually use physical memory at any given time. Such partitioning commonly results in severe underutilization of the shared resource.

Another prior method for allocating a shared resource is to allocate a portion of the shared resource to each requesting user on a first-come-first-served basis. For a physical memory having a storage capacity of C bytes, for example, C/10 bytes may be allocated to each requesting user. Unfortunately, such a method usually exhausts the capacity of the shared resource after the first 10 users, thereby locking subsequent users out of the shared resource.

SUMMARY OF THE INVENTION

A method is disclosed for flexible allocation of a resource. The method involves assigning a soft limit and a hard limit to each of a set of potential users of the resource. The soft limits are selected to guarantee access to the resource by all of the potential users. The hard limits are selected to enable each potential user to exceed the corresponding soft limit on a first-come-first-served basis. A request from a user for allocation of a portion of the resource is handled by granting the request if the request if allowed would not exceed soft limit assigned to the user. The request is denied if the request if allowed would exceed the hard limit assigned to the user. To avoid overtaxing the capacity of the resource, the request is denied even when the hard limit of the user is not exceeded if the request if allowed would cause a total allocation of the resource to exceed a high watermark assigned to the resource.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
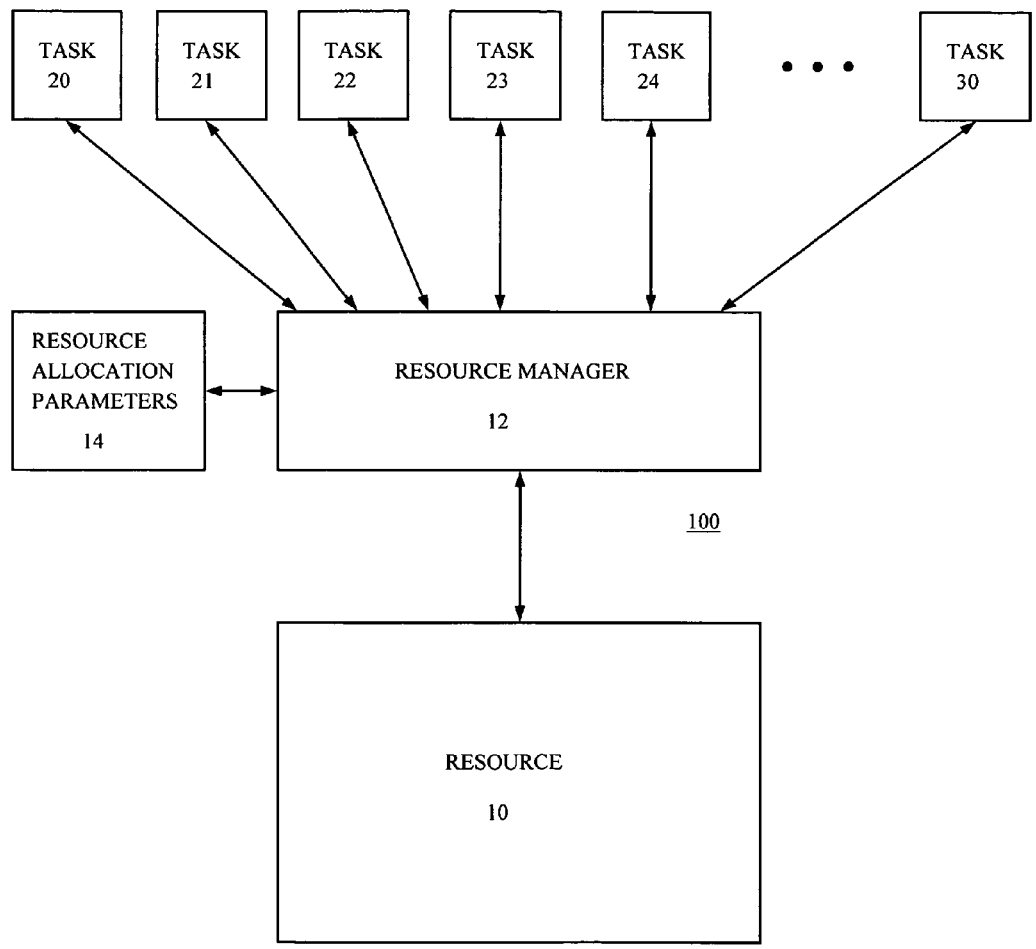
FIG. 1 shows a computer system that incorporates the present teachings.

FIG. 1 shows a computer system 100 that incorporates the present teachings. The computer system 100 includes a resource 10 that is shared among a set of tasks 20–30. Portions of the resource 10 are allocated to the tasks 20–30 by a resource manager 12. The resource manager 12 maintains a set of resource allocation parameters 14 which are used in resource allocation.

The resource 10 represents any resource having a limited capacity or capability that may be allocated among the tasks 20–30. The resource 10 may be a hardware resource, a software resource, or a combination hardware/software resource. Examples for the resource 10 include physical memory such as main memory, mass storage, persistent stores, information stores including databases, non-volatile memory, processor time, communication links, and input/output devices to name a few examples.

The tasks 20–30 represent software tasks that may be executed on the computer system 100. Examples for the tasks 20–30 include application programs and related software components and user interface tasks. Each task 20–30 may be associated with a particular user of the computer system 10. More than one of the tasks 20–30 may be associated with the same user. In one embodiment, the resource manager 12 allocates the resource 10 on a per user basis so that all of the tasks associated with a given user are confined to a portion of the resource 10 that is allocated to the given user by the resource manager 12.

The computer system 100 may be a single processor system, a multiple processor system, multiple networked computer systems, multiple networked devices which include computing capabilities, or any combination of these. The resource manager 12 may be part of an operating system of the computer system 100, may be a component such as a device driver, and/or may function as a server for the resource 10 that handles requests from the tasks 20–30 which function as clients.

The capacity or capability of the resource 10 may be expressed in terms of units. For example, if the resource 10 is a memory then a unit may be a byte, a block, a line, a kilobyte, a megabyte, etc. In another example, if the resource 10 is a communication link then a unit may be a bit per second, a kilobit per second, or a megabit per second of communication bandwidth, etc. In yet another example, if the resource 10 is a processor then a unit may be a million instructions per second (MIPS) of processor execution time.

The resource manager 12 receives requests from the tasks 20–30 for allocation of the resource 10. The resource manager 120 allocates portions of the resource 10 to the requesting tasks 20–30 using information provided by the resource allocation parameters 14.

The resource allocation parameters 14 include a total capacity or capability (T) of the resource 10 expressed in units. The value of T depends on the characteristics of the resource 10 and the selected units. For example, if the resource 10 is a 1000 megabyte memory then T equals 1000 if the units are megabytes.

The value of T may also take into account a portion of the resource 10 which is allocated to system functions and not available to the tasks 20–30. For example, if the resource 10 is a 1000 megabyte memory, then 50 megabytes may be reserved for system use and unavailable for allocation to the tasks 20–30. This yields a value of T of 950 units in megabytes.

The resource allocation parameters 14 include a soft limit (S) which applies to each potential user of the resource 10. The soft limit S is a minimum portion of the resource 10 to which each potential user has guaranteed access, thereby preventing potential users from being locked out of the resource 10 at any time.

The soft limit S is a tunable parameter of the computer system 100. It is preferable that S be set to a high enough value as to enable advantageous use of the resource 10 but not so high as to needlessly tie up the capacity of the resource 10 when only a few of the potential users access the resource 10.

The soft limit S may be the same for all potential users or may be set on a per user basis or on the basis of classes of users. For example, some classes of users such as those who pay more or those in management positions, etc., may have a higher soft limit than that of ordinary users.

The resource allocation parameters 14 include a hard limit (H) which enables users to exceed their soft limits under predetermined conditions. A given user is always granted his soft limit and may be granted up to his hard limit if the current utilization of the resource 10 can accommodate the request. The maximum value for the hard limit H is equal to T minus the sum of the soft limits of all potential users. The hard limit H is a tunable parameter of the computer system 100. The hard limit H may be the same for all potential users or may be set on a per user basis or on the basis of classes of users.

The resource allocation parameters 14 include a high watermark and a low watermark. The high watermark is an upper limit on the total utilization of the resource 10. The difference between the high and low watermarks provides hysteresis that prevents thrashing that would otherwise occur when one of the tasks 20–30 frees a portion of the resource 10 and then reallocates that portion when the resource 10 is near its capacity.

Figure 2:
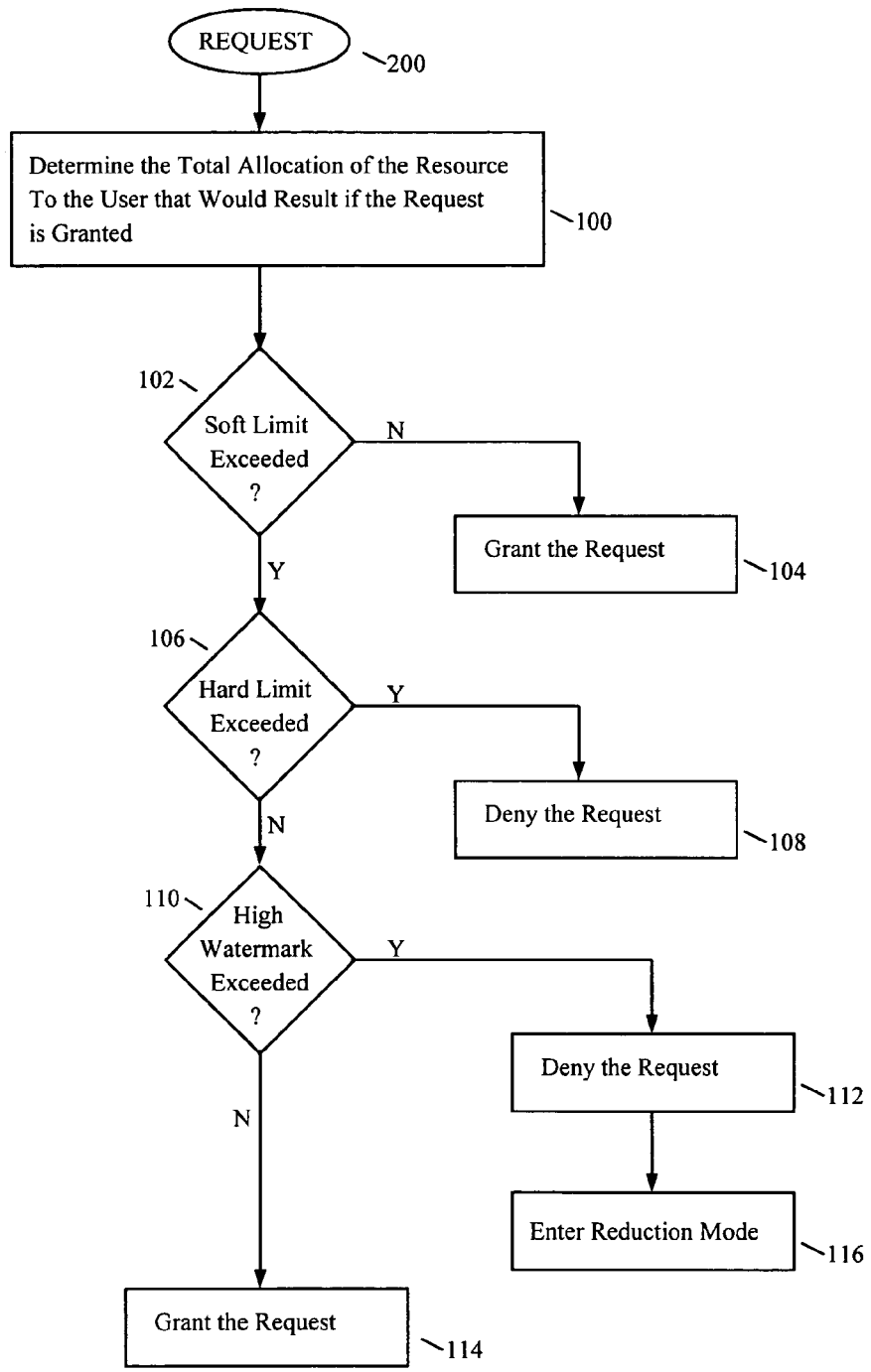
FIG. 2 illustrates the handling of a request for allocation of a resource by a resource manager in a normal mode in one embodiment.

FIG. 2 illustrates the handling of a request 200 for allocation of the resource 10 by the resource manager 12 in a normal mode in one embodiment. The normal mode of handling a request for allocation is the initial mode before the high watermark of the resource 10 has been exceeded.

In this example, the request 200 is generated by the task 20 and specifies a requested portion of the resource 10 expressed as n1 units. The request 200 may be an initial request for n1 units of the resource 10 or a subsequent request for additional allocation of n1 units of the resource 10.

At step 100, the resource manager 12 determines the total allocation of the resource 10 to the user associated with the task 20 that would result if the request 200 is granted. The resource manager 12 records allocations of the resource 10 to users on a per user basis. For example, assume that the task 20 corresponds to user A and that the tasks 21–22 also correspond to user A and have previously been granted n2, and n3 units of the resource 10, respectively. If so, the total allocation for the user A determined at step 100 is equal to n2+n3+n1. If tasks corresponding to the user A have not previously been granted any units of the resource 10 then the total allocation for the user A determined at step 100 is equal to n1.

At step 102, the resource manager 12 determines whether the total allocation obtained at step 100 exceeds the soft limit for the user associated with the task 20. If the total allocation obtained at step 100, which includes the request 200 for n1 units, would not exceed the user's soft limit then the request 200 is granted at step 104. Otherwise, the user's hard limit is tested at step 106.

At step 106, the resource manager 12 determines whether the total allocation obtained at step 100 exceeds the hard limit for the user associated with the task 20. If the total allocation obtained at step 100, which includes the new request 200 for n1 units, would exceed the user's hard limit then the request 200 is denied at step 108. Otherwise, the high watermark is tested at step 110.

At step 110, the resource manager 12 determines whether the total allocation obtained at step 100 would cause the grand total allocation of the resource 10 to all users to exceed the high watermark of the resource 10. If the granting of the request 200 would not cause the grand total allocation to exceed the high watermark then the request 200 is granted at step 114.

If the granting of the request 200 would cause the grand total allocation of the resource 10 to exceed the high watermark then at step 112 the request 200 is denied. In addition, at step 116 the resource manager 12 enters a reduction mode for handling requests. In the reduction mode, the resource manager 12 always allows requests the reduce the consumption of the resource 10.

Figure 3:
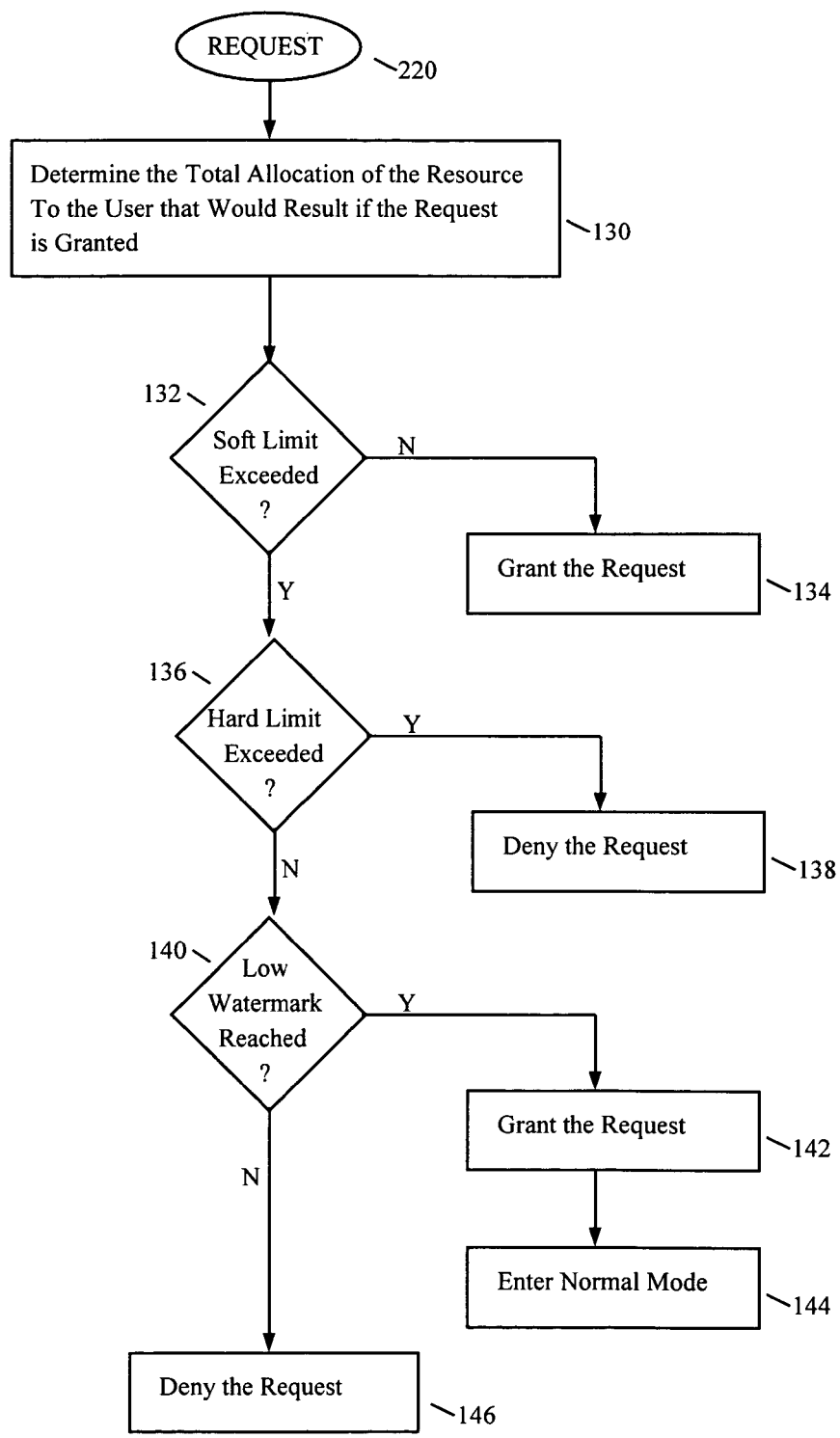
FIG. 3 illustrates the handling of a request for allocation of the resource by the resource manager in a reduction mode in one embodiment.

FIG. 3 illustrates the handling of a request 220 for allocation of the resource 10 by the resource manager 12 in the reduction mode in one embodiment. The reduction mode of handling a request for allocation provides hysteresis that prevents thrashing that would otherwise occur when one of the tasks 20–30 frees a portion of the resource 10 and then reallocates that portion when the resource 10 is near its capacity.

In this example, the request 220 is generated by the task 30 and specifies a requested portion of the resource 10 expressed as n10 units. The request 200 may be an initial request for the resource 10 by a user associated with the task 30 or a subsequent request for additional allocation of n10 units of the resource 10.

At step 130, the resource manager 12 determines the total allocation of the resource 10 to the user associated with the task 30 that would result if the request 220 is granted.

At step 132, the resource manager 12 determines whether the total allocation obtained at step 130 exceeds the soft limit for the user associated with the task 30. If the total allocation obtained at step 130, which includes the request 220 for n10 units, would not exceed the user's soft limit then the request 220 is granted at step 134. Otherwise, the hard limit is tested at step 136.

At step 136, the resource manager 12 determines whether the total allocation obtained at step 130 exceeds the hard limit for the user associated with the task 30. If the total allocation obtained at step 130, which includes the request 220 for n10 units, would exceed the user's hard limit then the request 220 is denied at step 138. Otherwise, the low watermark is tested at step 140.

At step 140, the resource manager 12 determines whether the total allocation of the resource 10 is below its low watermark. If the total allocation is not below the low watermark then the request 220 is denied at step 146.

If the total allocation is below the low watermark then the request 220 is granted at step 142. In addition, at step 144 the resource manager 12 returns to the normal mode for handling requests.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer-implemented method for flexible allocation of a resource, comprising the steps of:
    associating a soft limit and a hard limit to a potential user of the resource wherein the soft limit guarantees access to the resource by the potential user and the hard limit enables the potential user to exceed the soft limit on a first-come-first-served basis;
    obtaining a request for allocation of a portion of the resource for the potential user;
    granting the request if the request if allowed would not exceed the soft limit of the potential user;
    denying the request if the request if allowed would exceed the hard limit of the potential user;
    denying the request if the request if allowed would cause a grand total allocation of the resource for plural users to exceed a high watermark assigned to the resource and granting the request otherwise.

2. The method of claim 1, wherein the step of denying the request if the request if allowed would cause a grand total allocation of the resource for the plural users to exceed a high watermark further comprises the step of entering a reduction mode for handling a subsequent request for allocation of the resource.

3. The method of claim 2, wherein the reduction mode comprises the step of:
    granting the subsequent request if the subsequent request if allowed would not exceed a soft limit associated with a potential user associated with the subsequent request;
    denying the subsequent request if the subsequent request if allowed would exceed a hard limit associated with the potential user associated with the subsequent request;
    denying the subsequent request if the grand total allocation of the resource for the plural users is above a low watermark associated with the resource and granting the subsequent request otherwise.

4. The method of claim 3, further comprising the step of assigning the low watermark to the resource.

5. The method of claim 1, further comprising the step of assigning the soft limit to the potential user.

6. The method of claim 5, wherein the step of assigning the soft limit comprises the step of assigning the soft limit in response to a class associated with the potential user.

7. The method of claim 1, further comprising the step of assigning the hard limit to the potential user.

8. The method of claim 7, wherein the step of assigning the hard limit comprises the step of assigning the hard limit in response to a class associated with the potential user.

9. The method of claim 1, further comprising the step of assigning the high watermark to the resource.

10. The method of claim 1, further comprising the step of allocating a portion of the resource for system use.

11. A processor-based computer system, comprising:
    a resource;
    a set of resource allocation parameters for the resource including a high watermark for the resource and a hard limit and a soft limit associated with a potential user of the resource, the soft limit indicating a portion of the resource to which the potential user has access, and the hard limit enabling the potential user to exceed the soft limit if a current utilization of the resource permits;
    a task that generates a request for allocation of a portion of the resource;
    a resource manager that in a normal mode grants the request if the request if allowed would not exceed the soft limit and denies the request if the request if allowed would exceed the hard limit and denies the request if the request if allowed would cause a grand total allocation of the resource for plural users to exceed the high watermark and grants the request otherwise.

12. The computer system of claim 11, wherein the resource manager switches to a reduction mode if the request if allowed would cause the grand total allocation for the plural users to exceed the high watermark such that the resource manager grants all subsequent requests that reduce a consumption of the resource while in the reduction mode.

13. The computer system of claim 11, wherein the soft limit is assigned to the potential user to guarantee access to the resource by the potential user.

14. The computer system of claim 11, wherein the hard limit is assigned to the potential user to enable the potential user to exceed the soft limit on a first-come-first-served basis.

15. The computer system of claim 11, wherein the resource manager enters a reduction mode for handling a subsequent request for allocation of the resource if the request if allowed would exceed the high watermark.

16. The computer system of claim 15, wherein the resource manager in the reduction mode grants the subsequent request if the subsequent request if allowed would not exceed a soft limit associated with a potential user associated with the subsequent request and denies the subsequent request if the subsequent request if allowed would exceed a hard limit associated with the potential user associated with the subsequent request and denies the subsequent request if the grand total allocation of the resource for the plural users is above a low watermark associated with the resource and grants the subsequent request if the grand total allocation for the plural users is below the low watermark.

17. The computer system of claim 16, wherein the resource manager switches to the normal mode if the grand total allocation for the plural users is below the low watermark.

18. A computer-implemented method of allocating a resource, comprising:
    providing a first limit, a second limit, and a high water mark for the resource, the first limit indicating a portion of the resource to which a first user has access, and the second limit enabling the first user to exceed the first limit if a current utilization of the resource permits;
    receiving a request from a task associated with the first user for allocation of a portion of the resource;
    granting the request in response to determining that granting of the request would not cause allocation of the resource for the first user to exceed the first limit;
    denying the request in response to determining that granting the request would cause allocation of the resource for the first user to exceed the second limit; and denying the request in response to determining that total allocation of the resource to plural users including the first user would exceed the hiigh watermark.

19. The method of claim 18, further comprising granting the request in response to determining that granting the request would cause allocation of the resource for the first user to exceed the first limit but the total allocation of the resource to the plural users including the first user would not exceed the high watermark.

20. The method of claim 19, further comprising entering a reduction mode in response to determining that the total allocation of the resource to the plural users would exceed the high watermark, the method when in reduction mode comprising:
  in response to a second request from the task associated with the first user for allocation of a portion of the resource,
    granting the second request in response to determining that granting the second request would not cause allocation of the resource to the first user to exceed the first limit,
    denying the second request in response to determining that granting the second request would cause allocation of the resource to the first user to exceed the second limit, and
    denying the second request in response to determining that granting the second request would cause the total allocation of the resource to the plural users to be above a low watermark, the low watermark lower than the high watermark.

21. The method of claim 20, wherein the method when in reduction mode further comprises:
  granting the second request in response to determining that granting the second request would cause allocation of the resource for the first user to exceed the first limit but the total allocation of the resource for the plural users to be less than the low watermark; and
  exiting the reduction mode in response to determining that granting the second request would cause the total allocation of the resource for the plural users to be less than the fourth limit.

22. The method of claim 18, wherein the first limit, second limit, and high watermark are different.

23. A processor-based computer system comprising:
  a resource;
  resource allocation parameters for the resource, the resource allocation parameters including a first limit, a second limit, and a high water mark for the resource, the first limit indicating a portion of the resource to which a first user has access, and the second limit enabling the first user to exceed the first limit if a current utilization of the resource permits;
  a task associated with the first user to generate a request for allocation of a portion of the resource; and
  a resource manager responsive to the request to:
    grant the request in response to determining that granting the request would not cause allocation of the resource for the first user to exceed the first limit;
    deny the request in response to determining that granting the request would cause allocation of the resource for the first user to exceed the second limit; and
    deny the request in response to determining that total allocation of the resource to plural users including the first user would exceed the high watermark.

24. The computer system of claim 23, wherein the resource manager is responsive to the request to grant the request in response to determining that granting the request would cause allocation of the resource for the first user to exceed the first limit but the total allocation of the resource to the plural users including the first user would not exceed the high watermark.

25. The computer system of claim 24, wherein the resource manager is adapted to cause the resource manager to enter a reduction mode in response to determining that the total allocation of the resource to the plural users would exceed the high watermark, the resource manager when in the reduction mode to:
  in response to a second request from the task for allocation of a portion of the resource,
    grant the second request in response to determining that granting the second request would not cause allocation of the resource to the first user to exceed the first limit,
    deny the second request in response to determining that granting the second request would cause allocation of the resource to the first user to exceed the second limit, and
    deny the second request in response to determining that granting the second request would cause the total allocation of the resource to the plural users to be above a low watermark, the low watermark lower than the high watermark.

26. The computer system of claim 25, wherein the resource manager when in reduction mode is adapted to further:
  grant the second request in response to determining that granting the second request would cause allocation of the resource for the first user to exceed the first limit but the total allocation of the resource for the plural users to be less than the low watermark; and
  exit the reduction mode in response to determining that granting the second request would cause the total allocation of the resource for the plural users to be less than the low watermark.

* * * * *